Patented Mar. 24, 1953

2,632,772

UNITED STATES PATENT OFFICE 2,632,772

MANUFACTURE OF PEROXIDIC COMPOUNDS

Godfrey Paul Armstrong, Epsom Downs, Reginald Harold Hall, Carshalton, Denis Cheselden Quin, Epsom, and Karl Heinrich Walter Turck, Banstead, England, assignors, by mesne assignments, to Hercules Powder Company, a corporation of Delaware No Drawing. Application March 19, 1948, Serial No. 15,954. In Great Britain April 1, 1947

8 Claims. (Cl. 260—610)

The present invention relates to improvements in and a process for the production of peroxides from isopropyl benzene. By the expression "peroxides" is meant the peroxide as well as the hydroperoxide.

The preparation of isopropyl benzene peroxide from isopropyl benzene has been described by Hock and Lang in Berichte (1944) vol. 77 page 257. They proceeded by shaking the said hydrocarbon with dry oxygen with concurrent exposure to shortwave irradiation. In this way they succeeded in converting into the corresponding hydroperoxide not more than 24 grams out of 360 grams of isopropyl benzene treated within 24 hours, that is, 2.4 grams per hour per litre or an overall rate of approximately 0.3% by weight per hour. It is evident that such a process cannot form the basis for large scale production. A technically feasible process on the other hand becomes of primary importance since the said peroxidic compounds may form intermediates for the economical preparation of phenolic compounds.

It has been found, furthermore, that when liquid hydrocarbons of the kind indicated above are subjected to an oxidation treatment by bringing them into intimate contact with molecular oxygen the oxidation proceeds extremely slowly for a considerable time at the start, and during this induction period the rate of oxygen absorption increases only gradually. The addition of certain catalysts such as copper may overcome this difficulty but generally leads to a considerably lower efficiency as regards the production of peroxidic compounds and frequently results in the production of large amounts of carbon dioxide by complete combustion of the starting material.

It is an object of this invention to provide a process which makes the commercial production of peroxidic compounds from isopropyl benzene possible. It is another object of the invention to reduce the induction period for the oxidation reaction to a minimum and thus increase the overall yield of the peroxidic compounds over a certain time.

According to the present invention isopropyl benzene peroxide is produced by bringing isopropyl benzene in the liquid phase, in the absence of heavy metal oxidation catalysts, into intimate contact with molecular oxygen at temperatures between 70° and 150° C. and adding to the reaction mixture fresh isopropyl benzene continuously or intermittently whilst the oxidation reaction proceeds.

Preferably the addition of the fresh isopropyl benzene to the reaction mixture is started after the rate of oxidation in the said mixture has become practically constant. A preferred method of carrying out the process in practice consists in withdrawing an amount of the reaction mixture corresponding to and commensurate with the quantity of fresh isopropyl benzene added thereto, so that the volume of the reaction mixture in the reactor remains constant.

By introducing fresh isopropyl benzene to the reaction mixture in operation the rate of oxidation per unit volume is not decreased as was to be expected judging from the fact that with the fresh isopropyl benzene fresh material which had been inhibiting or retarding the oxidation at the start is continuously added to the reaction mixture. It is therefore, surprising that in spite of the continuous addition of the fresh isopropyl benzene according to the invention a high rate of oxidation of the starting material per unit volume is maintained.

The molecular oxygen for the oxidation may be in the form of practically pure oxygen, of gases rich in oxygen, such as commercial oxygen or in the form of gas mixtures which are richer in oxygen than is air. The use of super-atmospheric pressure is advantageous.

The presence of ozone in the gases containing oxygen has also proved to be advantageous. The use of short wave irradiation is not necessary for carrying out the process of the invention, but may be advantageous in some cases.

Furthermore, Hock and Lang (loc. cit.) have stated that in the case of isopropyl benzene decomposition of the peroxide formed does not begin below a temperature of from 165°–170° C. We have found, however, that a certain decomposition of the percompounds occurs during the oxidation which affects adversely the yields of percompounds produced, even when the temperatures during the oxidation operation are kept below said temperatures. This decomposition depends apparently on the concentration of the peroxidic compounds present in the reaction mixture. It is, therefore, a further object of this invention to reduce this decomposition and keep it at a minimum. This is achieved by feeding fresh isopropyl benzene to the reaction mixture and withdrawing the commensurate amount of the latter at such a rate that the amount fed in is more than twice, preferably more than three to four times, the amount which under the prevailing conditions is oxidised during the same time, so that the peroxide concentration in the reaction mixture does not exceed 50% and is preferably less than 25%. The residence time of the reaction mixture in the reactor is therefore comparatively short whereby the decomposition of the peroxide already formed in the mixture is minimised.

It is advantageous to provide for the presence in the reaction mixture of small amounts of alkali. These amounts are preferably at least sufficient to neutralise any carboxylic acids which are present or may be formed during the reaction. A small excess of alkali in the reaction mixture will not disadvantageously influence the oxidation reaction.

As alkali may be used the carbonates or hydroxides of alkali metals, such as sodium and potassium hydroxide, also the oxides or hydroxides of alkaline earths such as calcium and barium, the normal phosphates of the said metals, ammonia and the like. It has been found convenient to add for instance the hydroxides in the form of a concentrated aqueous solution, whereby a good dispersion of the alkali in the reaction mixture is assured even if the isopropyl benzene is used without diluent.

By the term "liquid phase" it is to be understood that the medium into which the gas containing molecular oxygen is introduced is liquid at the reaction temperature. When isopropyl benzene alone is used initially the liquid phase is homogeneous. On the other hand, a liquid diluent which is immiscible with isopropyl benzene may be used in conjunction with the isopropyl benzene. In this case the liquid phase is heterogeneous. As such diluent any liquid immiscible with isopropyl benzene and not harmful to or harmfully affected by the oxidation reaction may be employed. Such a diluent is for instance water.

The preferred method for carrying out the oxidation in the presence of water is to introduce the oxygen into an oil-in-water dispersion prepared advantageously with the aid of emulsifying agents such as sodium ricinoleate or lauryl sulphate as described in the copending patent application Ser. No. 738,726, now Patent. No. 2,547,938. In this case the isopropyl benzene and the aqueous phase are continuously or intermittently fed into the reactor, provision being made for maintaining said dispersion and preferably, concurrently with said addition, such an amount of the resulting reaction mixture is withdrawn that the volume of the liquid in the reactor remains practically constant. The proportion of water to oil in the dispersion may be adjusted in such a way that the production of a maximum concentration of peroxides in the reaction mixture is possible without any appreciable decomposition of the peroxides taking place in the reaction mixture. A proportion by volume of five of water to one of isopropyl benzene gave useful results and allowed the production of a concentration of 30% and more of peroxides in the reaction mixture with an efficiency of 80% and more.

The temperature advantageously maintained in the dispersed reaction mixture is within the range of 80° to 120° C. preferably about 100° C. In this case the addition to the oil-in-water dispersion of alkaline substances is effected with advantage by adding alkali hydroxides in such amounts that a pH between 7.5 and 10.5 is maintained in the aqueous phase. As the pH value changes during the progress of the oxidation it is advantageous to maintain the pH value at the said level by periodical addition of small quantities of said alkali.

When water is used as diluent in the manner described the fresh isopropyl benzene is added to the reaction mixture according to this invention preferably in the form of an oil-in-water dispersion. The liquid mixture withdrawn from the reactor commensurately with the said addition is preferably transferred to a decanter wherein the aqueous phase separates from the oil phase which latter contains the greater part of the peroxide formed dissolved in unchanged isopropyl benzene. The aqueous phase may then be returned with great advantage to the reactor oxidiser. On reusing the aqueous phase for the oil-in-water dispersion the oxidation sets in immediately even if the process is carried out as a batch process and the absorption of the oxygen by the isopropyl benzene reaches its maximum rate almost at once.

When using the alternative method for carrying the invention into effect comprising introducing the oxygen or oxygen containing gases into isopropyl benzene in the homogeneous liquid phase, the most favourable temperatures, within the above mentioned range of 70° to 150° C. are between 115° and 150° C. and especially 120° to 140° C. It has been found moreover that in spite of these elevated temperatures the primarily formed peroxide does not at first decompose excessively, but as time goes on this decomposition tends to become autocatalytic. This acceleration of the decomposition in consequence of the autocatalytic effect occurs when the efficiency as hereinafter defined drops to 80% and less. It is therefore a special feature of the invention when oxidising the isopropyl benzene in the homogeneous liquid phase to limit the time of reaction and of residence in the reaction zone so that the efficiency of the process does not fall below 80%.

By "efficiency" is meant here the proportion of mols of peroxide in the reaction mixture to the number of mols of oxygen absorbed by 100 mols of isopropyl benzene initially present. The proportion of peroxide in the reaction mixture i. e. its concentration per 100 mols of isopropyl benzene initially present is determined by the withdrawal of samples of the reaction mixture followed by iodometric titration of the peroxide content therein.

It is therefore possible to obtain a high rate of hourly output of peroxide provided that the time of oxidation is restricted.

The following Tables IA and IB refer to batch experiments and show that the efficiency has initially a high value, and that this decreases as the oxidation reaction proceeds; the rate of decrease of the efficiency is at first slow but later becomes considerably more rapid beyond the point where the peroxide concentration is at a maximum and the efficiency about 80%.

TABLE IA

[At 120° C.]

| Time, Hours | Rate | Peroxide Concentration | Efficiency |
|---|---|---|---|
| 1 | 0.2 | | |
| 2 | 1.0 | 1 | |
| 3 | 2.1 | 2.5 | 97 |
| 4 | 3.6 | 6 | 96 |
| 5 | 5.4 | 10 | 95 |
| 6 | 8.2 | 17 | 93 |
| 7 | 9.0 | 24 | 90 |
| 8 | 7.8 | 31 | 89 |
| 9 | 6.0 | 34 | 84 |
| 10 | 3.9 | 34 | 77 |
| 11 | 2.3 | 32 | 68 |

TABLE IB

[At 130° C.]

| Time, Hours | Rate | Peroxide Concentration | Efficiency |
|---|---|---|---|
| 1 | 1.4 | 1 | 100 |
| 2 | 5.2 | 6.5 | 98 |
| 3 | 9.0 | 13.5 | 94 |
| 4 | 13.2 | 21 | 89 |
| 5 | 10.0 | 30 | 82 |
| 6 | 7.0 | 31 | 73 |
| 7 | 4.8 | 25 | 56 |

The term "Rate" is used to express the mols of oxygen absorbed per hour, and the term "Peroxide concentration" the mols of peroxide present, in both cases per 100 mols of isopropyl benzene initially present.

The present invention therefore comprises keeping the oxidation reaction within such limits that the decrease in efficiency does not become accelerated i. e. such that the efficiency does not fall below 80%. Since the decomposition of the peroxide proceeds, moreover, under the influence of the high temperature the residence time of the reaction mixture in the reaction zone should be as short as possible. It is therefore preferred to remove the reaction mixture from the reaction zone as soon as or before the oxidation reaction reaches those limits and preferably to cool it so that further decomposition is prevented. As on the other hand the oxidation proceeds at a very much higher rate when the temperature is near the upper limit, it is a further feature of this invention to carry out the oxidation at the start at the higher temperature i. e. at about 140° to 150° C. and then to reduce the temperature in the reaction mixture and proceed with the oxidation at about 115° to 125° C.

The figures given in the Tables IA and IB were obtained by tests carried out in a batchwise manner.

The second columns of the above Tables IA and IB, show that the rate of oxygen absorption rises in each run until it reaches a maximum. At 120° C. this maximum rate of absorption is attained after about 7 hours, and at 130° C. after about four hours. Thereafter it falls fairly rapidly until the rate of oxygen absorption has dropped to approximately one-third to one-quarter of the maximum rate during the last hour indicated in the tables. The efficiency, as can be seen, remains high, that is about 90% and more, whilst the oxygen absorption rate rises and the peroxide concentration increases. It is therefore a preferable feature of this invention to stop the introduction of oxygen into the reaction mixture whilst the rate of oxygen absorption is still increasing. In this manner the best use is made of the oxygen introduced into the reaction mixture and of the isopropyl benzene, before the decomposition of the peroxide formed leads to any substantial extent to the formation of undesired by-products.

The method, by which the residence time required to maintain any desired conditions in a continuous process may be calculated approximately from results obtained in a batch process carried out under similar temperature conditions, is illustrated in Table II below. The desired condition to be maintained in a continuous process is here for instance a peroxide concentration of 8%, and the figures given for the rate and efficiency are those obtained in a batch process at the temperature indicated when the peroxide concentration reaches this figure. The residence time is then calculated using the expression:

$$\text{Residence time} = \frac{\text{Peroxide concentration} \times 100}{\text{Rate} \times \text{Efficiency}}$$

The terms "Peroxide concentration" and "Rate" have here the same meaning as hereinbefore defined. The term "Efficiency" here used is the proportion of mols of peroxide produced to mols of oxygen absorbed by 100 mols of isopropyl benzene over a short period (e. g. 1 hour) which is chosen to correspond to the time at which the other quantities are recorded.

TABLE II

| Temperature, °C. | Peroxide Concentration, Percent | Rate, Mols Percent/Hr. | Efficiency, Percent | Calculated Residence Time Required, Hours |
|---|---|---|---|---|
| 85 | 8 | 0.6 | 65 | 20.5 |
| 110 | 8 | 1.7 | 94 | 5.0 |
| 120 | 8 | 4.5 | 96 | 1.8 |
| 130 | 8 | 6.4 | 97 | 1.3 |
| 140 | 8 | 17.0 | 91 | 0.5 |

When the process of the invention is carried out in the homogeneous liquid phase i. e. a liquid phase in which no immiscible diluent is present, the alkaline substances which are to neutralize the carboxylic acids present or formed during the reaction may be added in the form of a concentrated aqueous solution of water-soluble alkaline compounds such as alkali metal hydroxides.

The quantity of alkali added is with advantage adjusted in such a way that when a filtered sample of the reaction mixture is extracted with about twice its volume of distilled water the pH value of the aqueous extract is not less than 4 when measured electrometrically. In the continuous process the alkaline substance is advantageously introduced into the system with the fresh isopropyl benzene. Apart from preventing the corrosion of iron vessels and the formation of soluble metal compounds the effect of the alkali addition is that the maximum rate of oxygen absorption is higher and is reached in a shorter time, and that the peroxide concentration in the reaction mixture is greater than in those obtained in the absence of alkali. In other respects such as the efficiency the course of the reaction in the presence of alkali is very similar to that which the process takes in the absence of the alkali. The alkaline substances are preferably added in the form of concentrated solutions, for instance of alkali metal hydroxides in order to facilitate their introduction and their uniform distribution. The amount of water in the solution is advantageously limited so that at the reaction temperature it is evaporated with great rapidity. At any rate, it should be so limited that substantially no heterogeneous liquid phase is formed in the reaction mixture.

The oxidation process in the homogeneous liquid phase may be carried out conveniently in a tower or similar apparatus, into one end of which the isopropyl benzene, preferably preheated or partly preoxidised is fed, whilst at the other end the isopropyl benzene peroxide containing the reaction product is withdrawn continuously or periodically in such a way that the concentration of peroxide within the tower or apparatus increases in the direction of the flow of the liquid. The dimensions of the tower and the volume of isopropyl benzene passed through said tower in the time unit, are adjusted so that the residence time in the said tower fulfills the features of this invention namely, that the liquid reaction mixture leaves the tower before the efficiency drops below 80% or before the maximum rate of oxygen absorption thereby is attained.

It is also possible to carry out the process in a series of continuous reaction vessels, each of which works on a certain peroxide level. The fresh isopropyl benzene fed into the tower or the first of the series of reaction vessels contains preferably, some previously formed peroxide to initiate the oxidation reaction.

For carrying out the process of the present invention it is preferred to use isopropyl benzene for the oxidation which is free from unsaturated compounds such as styrenes and/or substances which act as catalysts for decomposition of the peroxide formed during the oxidation. Styrene and styrene compounds such as methyl styrene produce a deleterious effect upon the oxidation reaction even in such minute quantities as 50 parts per million (p. p. m.). Said compounds may be removed for instance by washing with sulphuric acid and/or alkali metal permanganate solution or by their conversion into separate compounds or by hydrogenation for instance by means of Raney nickel. It is however possible to use in the process according to this invention commercial isopropyl benzene which has been purified by a single distillation only and to maintain the oxidation at a high rate as soon as it is once established. It is however, preferred to use isopropyl benzene which has been previously purified by the means described above as the efficiency of the oxidation reaction is better with purified isopropyl benzene than when isopropyl benzene is used which has not been purified. Substances which act as catalysts for the decomposition of the peroxide are for instance soluble compounds such as copper, cobalt, manganese and the like. It is however possible to carry out the oxidation in metal reactors which are not attacked under the conditions of the reaction, such as for example mild steel in the presence of alkali.

The isopropyl benzene peroxide formed may be isolated from the reaction mixture in the well-known manner or may be subjected immediately to decomposition for the manufacture of acetone and phenol.

The following examples show the manner in which the process of the invention may be carried out in practice:

Example 1

In a stirring vessel, fitted with an overflow seal and with a reflux condenser, a mixture of 200 cc. of isopropyl benzene and 400 cc. of an aqueous solution, containing 1.4 grams of sodium stearate and 5.3 grams of sodium carbonate ($Na_2CO_3$) were vigorously stirred while oxygen (about 90% $O_2$) was passed through the mixture. The temperature was kept at 85° C. After 10½ hours, the reaction mixture contained 48.2 grams of peroxide (calculated as isopropyl benzene peroxide), which corresponds to an average hourly production of 4.6 grams of peroxide.

From this time onwards 59 cc. of isopropyl benzene containing 0.65% weight by volume (w./v.) stearic acid and 118 cc. water containing 0.048% w./v. sodium hydroxide and 0.75% w./v. sodium carbonate were continuously fed to the oxidiser per hour, while at the same time through the overflow the emulsified reaction product overflowed, so that the volume in the oxidiser was constant. Within 4 hours 720 cc. of a mixture were collected which contained 54.5 grams of peroxide. This corresponds to an average hourly production of 13.6 grams of peroxide, i. e. about 3 times that obtainable in the initial batch operation, though in both cases the liquor finally withdrawn from the reactor contained the same concentration of peroxide.

Example 2

The oxidiser was charged with 200 cc. of isopropyl benzene free from peroxides and styrene, and 400 cc. of water containing 1.4 grams of sodium stearate and 5.3 grams sodium carbonate. As soon as the agitation was started an emulsion formed. Oxygen was admitted and the temperature kept at 85° C. After a period of 1½ hours the rate of absorption increased steadily. After 9.3 hours the rate of absorption was 1.2 litres per hour (4.0 mol percent/hr.) a total of 5.4 litres having been absorbed. The peroxide concentration was 14 mol percent on the isopropyl benzene.

Fresh isopropyl benzene and water containing sodium stearate and sodium carbonate in the same proportions as indicated above, were then introduced at the rate of 45 cc. of isopropyl benzene and 90 cc. of aqueous phase per hour. The absorption rate of oxygen continued to increase with no return to the induction period.

After a total reaction time of 29.3 hours the peroxide concentration had increased to 29 mol percent on the isopropyl benzene. Since a total of 1100 cc. of isopropyl benzene had been introduced from the start the total amount of peroxide produced was 2.3 mols or 348 grams of isopropyl benzene peroxide. A total of 66.7 litres of oxygen had been absorbed from the start of the experiment.

Example 3

Into a reactor fitted with an overflow and having a liquid capacity of 185 cc. were fed 370 cc. of purified isopropyl benzene per hour to which was added 0.05 cc. of a 50% NaOH solution every 10 hours. Through the overflow this vessel communicated with another vessel with an overflow volume of 700 cc. To the contents of this vessel was added 0.05 cc. of a 50% NaOH solution every 6 hours.

In the first reactor the temperature was maintained at 140° C. whilst oxygen of about 90% purity was introduced and absorbed at the rate of 9.2 mol percent per hour. The residence time in this vessel was 30 minutes and the concentration of the peroxide produced in this vessel was 4.4 mol percent. The temperature in the second vessel was kept at 130° C. The oxygen absorption in this vessel amounted to 11.4 mol percent per hour and the produced peroxide amounted to 23 mol percent concentration. The residence time in this vessel was 1 hour 53 minutes.

The efficiency in the first vessel was 96% whilst the efficiency in the second was 86%; the total oxygen absorbed by the contents of the two vessels per 100 mols of isopropyl benzene initially fed into the first vessel came to 26.1 mols and the total of peroxide formed to 22.9 mols, the efficiency over both stages thus being 88%.

Example 4

A reaction vessel equipped with a high speed agitator was charged with 150 cc. of purified isopropyl benzene to which 0.1 cc. of a 20% aqueous solution of sodium hydroxide had been added. The contents of the vessel were heated to 130° C. and oxygen of about 98% purity was introduced into the reactor. Absorption started within 15 minutes and the rate of absorption was 5.8 mol percent in the first hour of which 100% was converted into peroxide. In the second hour the oxygen absorption was 17.4 mol percent and the efficiency was 97%. The absorption of oxygen by the reaction mixture in the third hour was 20.6 mol percent, whilst the efficiency dropped to 93%. The oxygen introduction was then stopped before the absorption rate reached its previously ascertained maximum.

*Example 5*

Isopropyl benzene was oxidised in a mild steel vessel of 2 gallons capacity, equipped with a stirrer, liquid overflow, a reflux condenser and oxygen inlet line. The vessel was charged with isopropyl benzene purified by a single hydrogenation of a commercial product, and containing less than 40 p. p. m. of styrenes, and with 7 cc. of a 50% solution of sodium hydroxide. The temperature of the charge was raised to 130° C. and oxygen of 95% purity introduced. Absorption of oxygen started after a short time and after 0.5 hour had reached 9 mol percent per hour; at this point continuous feeds of fresh isopropyl benzene (similar to that used for the initial charge) and of 50% sodium hydroxide solution were started, and a corresponding volume of the oxidation product removed from the vessel continuously by way of the overflow. Steady conditions were reached in less than 7 hours from the start of the run, the data for which are given below.

At a later stage of the run a feed of untreated commercial isopropyl benzene containing about 500 p. p. m. of alpha-methylstyrene was substituted for the hydrogenated material, and the conditions were adjusted so that the peroxide concentration in the product remained substantially constant. The figures for the steady conditions obtained are also given below.

of 0.3 litre/hour whereby a similar amount of reaction mixture overflowed from the decanter. Oxygen was introduced into the system and absorbed by the reaction mixture at a rate of 13.09 litres/hour. In the oil which had overflowed from the decanter the peroxide concentration amounted to 25.6 grams in each 100 cc. and the total peroxide production during 24 hours thus came to 184 grams with an efficiency regarding oxygen consumption of 86% and a conversion of isopropyl benzene to isopropyl benzene peroxide calculated on the oxygen used of 21%.

What we claim is:

1. A process for the production of isopropylbenzene hydroperoxide which comprises contacting a reaction mixture consisting of a dispersion in liquid phase of isopropylbenzene and aqueous alkali with a gas containing molecular oxygen at a temperature between 70° and 150° C., whereby oxidation of the isopropylbenzene to isopropylbenzene hydroperoxide takes place, adding fresh isopropylbenzene to the reaction mixture while the oxidation proceeds and adding alkali in an amount sufficient to neutralize any carboxylic acid formed during the oxidation.

2. A process for the production of isopropylbenzene hydroperoxide which comprises contacting a reaction mixture consisting of a dispersion in liquid phase of isopropylbenzene and aqueous alkali with a gas containing molecular oxygen at a temperature between 70° and 150° C., whereby oxidation of the isopropylbenzene takes place, adding continuously fresh isopropylbenzene to the reaction mixture while the oxidation proceeds and withdrawing the reaction mixture from the reaction zone in an amount commensurate with the addition of fresh isopropylbenzene made thereto, and adding alkali in an amount sufficient to neutralize any carboxylic acid formed during the oxidation.

3. A process for the production of isopropylbenzene hydroperoxide which comprises contacting a reaction mixture consisting of a dispersion in liquid phase of isopropylbenzene and aqueous alkali with a gas containing molecular oxygen at a temperature between 70° and 150° C., whereby

| Feed Material | Hydrogenated Com'l Isopropyl Benzene | Untreated Com'l Isopropyl Benzene |
|---|---|---|
| Isopropyl benzene feed rate (litres per hour per litre volume of reaction liquid). | 0.62 | 0.54. |
| Alkali feed rate (cc. 50% NaOH per litre volume of reaction liquid). | 0.5 | 0.5. |
| Oxygen absorption rate (mols per hour per 100 mols of isopropyl benzene). | 21.7 l./hr./litre—13.5 | 20.9 l./hr./litre—14.2. |
| Peroxide make | 134 grams/hr./l | 122 grams/hr./l. |
| Peroxide concentration in product (percent by weight). | 23.9 | 24.7. |
| Efficiency of peroxide production (percent on $O_2$ consumed). | 91 | 88. |

*Example 6*

A mild steel pot of about 9 litres capacity was charged with 2.3 litres of isopropyl benzene and 5.7 litres of water. The mixing of the oil and the aqueous phase was accomplished by means of a recycle stirrer. Attached to the separator was a small decanter of about 50 cc. capacity wherein the oil and aqueous phase separated, the oil overflowing and the aqueous phase being returned from the bottom of the reactor. Oxygen and fresh isopropyl benzene were fed in through the lid of the reactor. The temperature in the reaction mixture was maintained between 84° and 86° C.

Fresh isopropyl benzene was added at a rate oxidation of the isopropylbenzene to isopropylbenzene hydroperoxide takes place, adding fresh isopropylbenzene to the reaction mixture while the oxidation proceeds at a rate of addition such that the hydroperoxide concentration in the reaction mixture is between 20 and 50%, and adding alkali sufficient in amount to maintain a pH of between 7.5 and 10.5 in the reaction mixture.

4. A process for the production of isopropylbenzene hydroperoxide which comprises contacting a reaction mixture consisting of a dispersion in liquid phase of isopropylbenzene and aqueous alkali with a gas containing molecular oxygen at a temperature between 70° and 150° C., whereby oxidation of the isopropylbenzene to isopropyl benzene hydroperoxide takes place, adding fresh isopropylbenzene to the reaction mixture after the rate of oxygen absorption by the reaction mixture has become constant, and adding alkali sufficient in amount to maintain a pH between 7.5 and 10.5 in the reaction mixture.

5. A process for the production of isopropylbenzene hydroperoxide which comprises contacting a reaction mixture consisting of a dispersion in liquid phase of isopropylbenzene and aqueous alkali with a gas containing molecular oxygen at a temperature between 115° and 150° C., whereby oxidation of the isopropylbenzene to isopropylbenzene hydroperoxide takes place, adding fresh isopropylbenzene to the reaction mixture while the oxidation proceeds and adding alkali sufficient in amount to maintain a pH of between 7.5 and 10.5 in the reaction mixture.

6. A process for the production of isopropylbenzene hydroperoxide which comprises contacting a reaction mixture consisting of a dispersion in liquid phase of isopropylbenzene and aqueous alkali with a gas containing molecular oxygen at a temperature between 135° and 150° C., until oxidation of the isopropylbenzene to isopropylbenzene hydroperoxide has taken place to an appreciable extent, thereafter continuing the oxidation at a temperature between 120° and 135° C., adding fresh isopropylbenzene to the reaction mixture while the oxidation proceeds and adding alkali sufficient in amount to maintain a pH of between 7.5 and 10.5 in the reaction mixture.

7. A process for the production of isopropylbenzene hydroperoxide which comprises contacting a reaction mixture consisting of a dispersion in liquid phase of isopropylbenzene and aqueous alkali with a gas containing molecular oxygen at a temperature between 115° and 150° C., whereby oxidation of the isopropylbenzene to isopropylbenzene hydroperoxide takes place, adding fresh isopropylbenzene to the reaction mixture while the oxidation proceeds and adding alkali sufficient in amount to maintain a pH of between 7.5 and 10.5 in the reaction mixture, and adjusting the oxidation of the reaction mixture so that the proportion of hydroperoxide concentration therein to the oxygen absorption per 100 moles of isopropylbenzene initially present does not fall below 80%.

8. A process for the production of isopropylbenzene hydroperoxide which comprises contacting a reaction mixture consisting of a dispersion in liquid phase of isopropylbenzene and aqueous alkali with a gas containing molecular oxygen at a temperature between 115° and 150° C., whereby oxidation of the isopropylbenzene to isopropylbenzene hydroperoxide takes place, removing part of the reaction mixture containing isopropylbenzene hydroperoxide stepwise to a successive stage, contacting the reaction mixture in said successive stage at a temperature between 115° and 150° C. with a gas containing molecular oxygen to continue the formation of isopropylbenzene hydroperoxide, removing part of the reaction mixture stepwise from said successive stage to at least one more successive stage and contacting the reaction mixture in said successive stage at a temperature between 115° and 150° C. with a gas containing molecular oxygen, adding fresh isopropylbenzene in each of the successive stages to maintain the hydroperoxide concentration in each stage at a substantially uniform level and increasing stepwise from the preceding to the subsequent stage, and adding alkali in each successive stage sufficient in amount to maintain a pH between 7.5 and 10.5 in each reaction mixture.

GODFREY PAUL ARMSTRONG.
REGINALD HAROLD HALL.
DENIS CHESELDEN QUIN.
KARL HEINRICH WALTER TURCK.

REFERENCES CITED

The following references are of record in the file of this patent:

UNITED STATES PATENTS

| Number | Name | Date |
|---|---|---|
| 2,379,390 | Tuerck | June 26, 1945 |
| 2,403,772 | Vaughn et al. | July 9, 1946 |
| 2,430,864 | Farkas | Nov. 18, 1947 |
| 2,447,794 | Brewer | Aug. 24, 1948 |
| 2,472,152 | Farkas et al. | June 7, 1949 |
| 2,484,841 | Lorand | Oct. 18, 1949 |